United States Patent
Graf et al.

(10) Patent No.: US 7,020,972 B2
(45) Date of Patent: Apr. 4, 2006

(54) PROCESS AND DEVICE FOR THE ALIGNING OF WORKPIECE WITH PRE-CUT TEETH ON GEAR FINISHING MACHINES

(75) Inventors: Jürg Graf, Fehraltorf (CH); René Ohm, Uster (CH)

(73) Assignee: Reishauer AG, Wallisellen (CH)

( * ) Notice: Subject to any disclaimer, the term of this patent is extended or adjusted under 35 U.S.C. 154(b) by 0 days.

(21) Appl. No.: 10/913,434

(22) Filed: Aug. 9, 2004

(65) Prior Publication Data
US 2005/0055836 A1    Mar. 17, 2005

(30) Foreign Application Priority Data
Sep. 12, 2003   (DE)   ................. 103 42 495

(51) Int. Cl.
*G01B 5/16*   (2006.01)
(52) U.S. Cl. .............. 33/501.7; 33/501.16; 33/502
(58) Field of Classification Search ............. 33/501.7, 33/501.11–501.19, 502, 628, 642
See application file for complete search history.

(56) References Cited

U.S. PATENT DOCUMENTS

| | | | | |
|---|---|---|---|---|
| 3,336,789 A | * | 8/1967 | Mayer | 33/501.19 |
| 3,724,084 A | * | 4/1973 | McNeece | 33/501 |
| 4,769,917 A | * | 9/1988 | Bertz et al. | 33/501.7 |
| 5,016,471 A | * | 5/1991 | Och | 33/501.13 |
| 5,392,644 A | * | 2/1995 | Frazier | 33/501.16 |
| 5,396,711 A | * | 3/1995 | Iwasaki et al. | 33/501.14 |
| 5,461,797 A | * | 10/1995 | Royer et al. | 33/501.7 |
| 5,689,993 A | * | 11/1997 | Matsumoto | 33/501.19 |
| 6,293,025 B1 | * | 9/2001 | Gill | 33/501.14 |
| 6,598,305 B1 | * | 7/2003 | McKinney et al. | 33/501.7 |
| 2004/0117998 A1 | * | 6/2004 | Och | 33/501.16 |
| 2005/0060903 A1 | * | 3/2005 | Winn | 33/501.13 |

FOREIGN PATENT DOCUMENTS

| | | |
|---|---|---|
| DD | 2 77 626 A1 | 4/1990 |
| DE | 36 15 365 C1 | 8/1987 |
| DE | 39 22 241 A1 | 1/1990 |
| JP | 11-0 77 432 A | 3/1999 |

OTHER PUBLICATIONS

Photographic Archives: Philosophical and Practical Issues, Rod Slemmons, 2002.*

* cited by examiner

*Primary Examiner*—G. Bradley Bennett
(74) *Attorney, Agent, or Firm*—Browdy and Neimark, PLLC

(57) ABSTRACT

The invention concerns a process for the aligning of the tooth spaces of workpieces (1) with precut teeth, which are set up for fine machining on the work spindle (2) of a gear finishing machine. In order to avoid the trend related occurrence of out-of-tolerance aligning errors as series production progresses, teach-in cycles are performed on the workpiece machined in the immediately preceding machining cycle, called for automatically after time intervals or machining cycle intervals which are either pre-defined or calculated by the machine control system. By this means any prevailing trend errors are restored to zero.

10 Claims, 1 Drawing Sheet

PROCESS AND DEVICE FOR THE ALIGNING OF WORKPIECE WITH PRE-CUT TEETH ON GEAR FINISHING MACHINES

FIELD OF THE INVENTION

The present invention concerns a process and a device for the alignment of the tooth spaces of pre-machined workpieces, which are set up for fine machining on the work spindle of a gear finishing machine.

BACKGROUND OF THE INVENTION

Increased demands on the running qualities of gears in gear drives require more and more the precision finish machining of the gear teeth. In most cases the pre-machined workpieces are case-hardened, and then fine machined to the finished dimensions on all their functional surfaces. In this process the fine machining of the tooth flanks in particular is a complicated, resource consuming, and hence expensive operation. In the interests of economic manufacture, but also in order to avoid having to provide for unnecessarily large hardening depths and to balance and minimize the wear on the left and right flanks of the fine machining tool, it is therefore attempted to keep the material allowance for the fine machining as small as possible. For the fine machining of the teeth this means in practice that the depth of cut per flank for material removal is only a few hundredths to at most two tenths of a millimetre. If, as is generally the case, the left and right flanks are machined in the same operation, this demands a very accurate alignment of the precut teeth relative to the fine machining tool, so that the latter can be brought exactly into the centre of the tooth spaces to be machined, in order to achieve uniform material removal from the left and right flanks of the workpiece.

In the aligning process most frequently encountered in practice on gear finishing machines, a non-contact functioning measuring probe, the aligning probe, is located at a geometrically suitable point in the working area of the machine. It is preferably positioned near the outer diameter of the pre-cut teeth of the workpiece set up on the work spindle. This aligning probe usually operates on an inductive, optical or magnetic principle. For the alignment the work spindle is rotated, and the angular positions of all the tooth flanks of the gear blank to be machined are measured by the aligning probe. Subsequently the average value of all the tooth space centre lines is calculated. This average value is compared with a desired value stored in the machine control system. The workpiece can now be aligned by turning the work spindle through an angle corresponding to the difference between the measured average value and the pre-defined desired value; that is, the average value and the desired value are brought to coincide in the machine control system.

The desired value of the angular position of the tooth space centre relative to the machining tool is determined by way of a so-called teach-in cycle during the setting up of the machine. To this purpose, an alignment measurement is performed on a workpiece which has been machined shortly beforehand, and which is still on the work spindle. Provided that both flanks of this workpiece are cleanly machined at the measuring point, i.e. both flanks are completely machined, in particular ground, these flanks represent an exact desired position of the tooth space centre relative to the machining tool. The desired value is then that angular position that is measured in this alignment measurement.

One of the pre-requisites for the attainment of a high aligning accuracy with the described procedure is that the measuring conditions for the aligning procedure during series production do not change relative to those during the machine setting process, or during the determination of the desired alignment value in the teach-in cycle. Practical experience shows, however, that in the course of series production aligning errors occur according to a time trend due to thermal or other physical influence. The result is differing material removal on the left and right flanks, or scrap as soon as due to the scant machining allowance the finish machining operation fails to embrace the entire flank surface on some flanks.

On account of the complex machine construction and processing sequence, and of the numerous physical factors of influence intrinsic to the process, the causes of such alignment errors varying to a trend pattern during series production can mostly only be determined and brought under control at great expense. In some cases the only method is the interruption of the production process and the repetition of the teach-in operation by the setter or the operator, by which production is considerably impaired and made more expensive. The necessity for this is often not realized until a substantial amount of scrap has already been produced.

SUMMARY OF THE INVENTION

The object of the present invention is to provide a process and a device by which, for the aligning of the teeth of a precut gear on a gear finishing machine, the aligning accuracy can be kept within close tolerance limits during the series production of a workpiece with little effort and expenditure.

This object is attained by way of a process and a device having the features stated in claim 1 and claim 9 respectively.

According to the invention, the teach-in cycle is automatically repeated in the course of series production on a workpiece just machined, with reference to at least one criterion which is based on the error trend behaviour of the machine.

Such criteria employed are preferably measurable characteristics that are readily accessible on such machines.

One criterion can be, for example, that a certain time interval has passed since the last teach-in cycle. Time intervals suitable for the purpose can, for example, be based on empirical observations of the machine. The attainment of a pre-defined number of workpieces or work cycles can also serve as criterion. The number of workpieces and the time interval can also be considered in combination. Furthermore standstill times of the machine can be taken into account.

In addition the required cutting force can be used as criterion, where for example a change in the torque or a one-sided cutting load on the tool is detected.

Thermal changes in the machine, which can be traced for example by means of a temperature probe, can also serve as criterion.

The above mentioned and further criteria can be taken into account by the machine control system, either individually or in combination, and with equal or differing weighting.

The criterion chosen for a solitary reference must be so selected, that the workpiece which serves as basis for a fresh teach-in cycle has both flanks cleanly machined. When such is the case is best determined empirically for this machine or for this machine type.

Thanks to the process according to the invention, any trend related aligning errors are restored to zero before the tolerance limit is transgressed.

BRIEF DESCRIPTION OF THE DRAWING

In the following the invention is explained in detail by way of a preferred embodiment, which is illustrated in the annexed drawing. The drawing depicts.

DETAILED DESCRIPTION OF A PREFERRED EMBODIMENT

Figure 1:
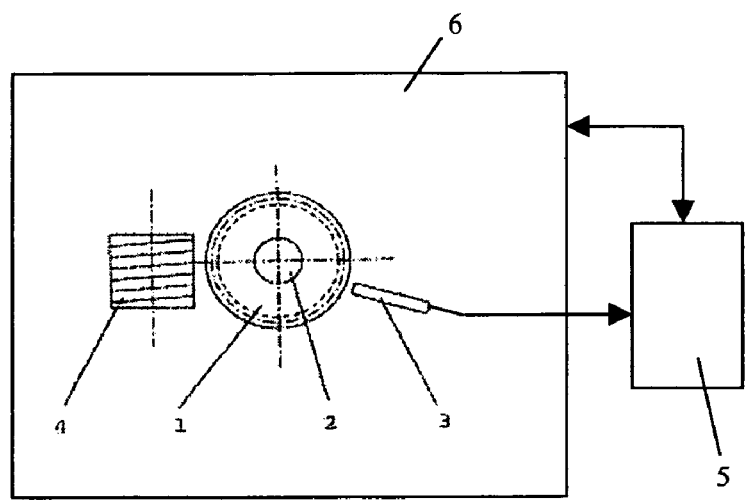
FIG. 1 the diagrammatically represented arrangement of the workpiece, aligning probe and machining tool on a gear manufacturing machine for the finish machining of gears with precut teeth.

FIG. 1 depicts the diagrammatic plan view arrangement of workpiece 1, aligning probe 3 and machining tool 4 on a gear manufacturing machine 6 for the finish machining machine or workpieces with precut teeth. Typical machining tools are for example grinding worms, grinding wheels, milling cutters, honing tools and the like.

The beginning of an automatic machining cycle corresponds with the procedure in accordance with the background of the invention described at the outset. Firstly, by means of a loading device not shown, a workpiece blank 1 is fitted and clamped in known manner on the spindle 2. After clamping, the spindle 2 is put into rotation, and in known manner by means of an aligning probe 3 the angular positions of the workpiece tooth flanks relative to the stationary aligning probe 3 are measured. From the measured data the machine control system calculates a mean value for the angular positions of all the tooth spaces. Then the workpiece 1 is rotated through the angular difference between this mean value and a desired value, and subsequently brought into engagement with the machining tool 4. The said desired value has been obtained beforehand in a known manner when setting up the machine, in that in a teach-in cycle with an already machined or pre-positioned setting workpiece the angular positions of the tooth spaces which represent the desired value are measured, and the measured value obtained is stored as desired value for use by the machine control system. After having been machined, the workpiece 1 is taken out of engagement, unclamped and removed from the spindle by the loading device, whereupon a new cycle can commence.

In the procedure known from practice according to the background of the invention, this process is repeated workpiece after workpiece until all components of the series have been machined. The process according to the invention, on the other hand, provides for the machine control system 5 to automatically call for a fresh teach-in cycle with reference to at least one given criterion, before the workpiece 1 just machined has been unclamped. In this teach-in cycle the angular position of the tooth space centre line of the just machined workpiece is measured. This measurement provides a new desired value which, according to the invention, is automatically substituted in place of the previously valid desired value. Not until then is the measured workpiece 1 unclamped and removed from the work spindle 2. The machining procedure is subsequently resumed in the known manner, until the machine control system once again calls for an automatic teach-in cycle on a workpiece just machined.

The pre-defined criterion for a solitary reference is for example the attainment of a pre-defined number of machining cycles performed. The number can depend for example on the machining time. This number of machining cycles till the next consecutive call for a teach-in cycle is preferably related to the empirically determined trend behaviour of the machine. The determination or calculation of the intervals between two consecutive teach-in cycles can be based on time, on a temperature measured on the machine, or on other decisive criteria. In the case of finish machining with a machining tool that can be re-dressed or re-sharpened on the machine, an automatic teach-in cycle is recommended e.g. after every re-dressing or re-sharpening cycle. It is also possible to take several such decisive criteria into account. It is furthermore possible to make the intervals between the individual teach-in cycles equal or variable.

Where required, the setter or operator can of course call manually for a teach-in cycle, whereupon the teach-in cycle itself subsequently takes place automatically.

LIST OF REFERENCE NUMBERS

1 Workpiece
2 Work spindle
3 Aligning probe
4 Machining tool

The invention claimed is:

1. Process for fine machining in a series production a plurality of workpieces with pre-cut teeth on a work spindle of a gear finishing machine, said machining process comprising the steps of:

setting up the gear finishing machine by performing a first teach-in cycle with a manually pre-aligned or already ground set-up workpiece in order to determine a first desired value for the tooth space centre line of the set-up workpiece;

storing said first desired value;

performing a series of successive machining cycles for finishing a series of workpieces, whereby prior to each of said machining cycles the respective workpiece is clamped in the machine for machining and the angular position of its tooth flanks is measured, and the workpiece to be machined is aligned with reference to said first desired value;

monitoring during said series of successive machining cycles at least one parameter of said machining process;

stopping said machining process between two successive machining cycles, when said at least one monitored parameter fulfils a predetermined criterion;

automatically performing a new teach-in cycle, wherein said workpiece of the last machining cycle remains clamped after said last machining cycle and is used as new set-up workpiece;

determining a second desired value for the tooth space centre line of the new set-up workpiece;

storing said second desired value as the new desired value for the next series of machining cycles; and repeating the steps of performing a series of successive machining cycles, monitoring said at least one parameter, stopping said machining process, automatically performing a new teach-in cycle, determining a next desired value, and storing said next desired value.

2. Process according to claim 1, wherein at least one parameter from the following group of parameters is monitored: the number of machining cycles, the time interval, the cutting force, and the temperature of the machine.

3. Process according to claim 2, wherein several of these parameters are taken into account, weighted or non-weighted.

4. Process according to claim 1, wherein the intervals between two successive teach-in cycles are constant.

5. Process according to claim 1, wherein the duration of the intervals between two successive teach-in cycles is determined automatically by the machine control system according to measurements of said parameters performed automatically by the machine.

6. Process according to claim 1, wherein the duration of the intervals between two successive teach-in cycles is based on the temperature characteristic of the machine.

7. Process according to claim 1, wherein a fresh teach-in cycle is called for automatically after every re-dressing or re-sharpening of a machining tool used in said machining process.

8. Process according to claim 1, wherein a fresh teach-in cycle can be called for manually by an operator, the fresh teach-in cycle taking place automatically after being triggered.

9. Process according to claim 1, wherein the intervals between two successive teach-in cycles are variable.

10. Device for the aligning of the tooth spaces of workpieces with pre-cut teeth, to be consecutively subjected in series production to a fine machining operation, the device having a work spindle for clamping one of these workpieces, a measuring probe for determining a tooth space centre line of the clamped workpiece, and an evaluation and control unit to compare the determined value of the tooth space centre with a stored desired value and to align the workpiece to be machined with reference to this desired value, the said desired value having been obtained from a first teach-in cycle, wherein the control unit possesses the means of monitoring at least one parameter of the machining process, and to automatically perform a fresh teach-in cycle with reference to the fulfilment of at least one criterion of said at least one parameter after completion of a machining cycle and with the workpiece still clamped in unaltered position, and to store the new desired value obtained from this fresh teach-in cycle for the purpose of using it for the aligning of subsequently set up workpieces of the same series.

* * * * *